United States Patent [19]

Wagner

[11] Patent Number: 4,707,981

[45] Date of Patent: Nov. 24, 1987

[54] VARIABLE EXPANSION RATIO REACTION ENGINE

[75] Inventor: William R. Wagner, Los Angeles, Calif.

[73] Assignee: Rockwell International Corporation, El Segundo, Calif.

[21] Appl. No.: 822,442

[22] Filed: Jan. 27, 1986

[51] Int. Cl.[4] .............................................. F02K 1/30
[52] U.S. Cl. ....................................... 60/242; 60/271; 239/265.17; 239/265.23
[58] Field of Search ................. 60/231, 233, 242, 265, 60/271, 204; 239/265.17, 265.23

[56] References Cited

U.S. PATENT DOCUMENTS

| | | | |
|---|---|---|---|
| 2,957,306 | 10/1960 | Attinello | 60/271 |
| 3,010,280 | 11/1961 | Hausmann | 60/242 |
| 3,374,954 | 3/1968 | Card | 239/127.1 |
| 3,481,543 | 12/1969 | Lovingham | 239/265.17 |
| 3,520,478 | 7/1970 | Shaler | 239/265.15 |
| 3,925,982 | 12/1975 | Mueller | 60/242 |
| 4,384,694 | 5/1983 | Watanabe et al. | 244/3.22 |
| 4,606,499 | 8/1986 | Langley | 60/271 |

FOREIGN PATENT DOCUMENTS

| | | | |
|---|---|---|---|
| 618830 | 4/1961 | Canada | 60/231 |
| 1124095 | 10/1956 | France | 239/265.23 |

Primary Examiner—Louis J. Casaregola
Attorney, Agent, or Firm—H. Fredrick Hamann; Harry B. Field; David C. Faulkner

[57] ABSTRACT

A reaction engine thrust chamber 12 is provided having non-mechanical means for varying the flow area of the rocket nozzle contingent upon the pressure environment, flight scenario and throttling demands. The non-mechanical means include a plurality of circumferentially and axially spaced injection ports 24 in cooperative relationship with control means 40 for selectively controlling a flow of fluid into the rocket nozzle throat section 18 of the thrust chamber.

6 Claims, 3 Drawing Figures

VARIABLE EXPANSION RATIO REACTION ENGINE

BACKGROUND OF THE INVENTION

1. Field of the Invention

The present invention relates to reaction engine thrust chambers and more particularly to thrust chambers having means for controlling the nozzle expansion of flow area ratio for throttling and improved specific impulse performance purposes. Applicability in gas, variable throat, steam and fluid nozzles, and also in subsonic and supersonic diffuser configurations is foreseen.

2. The Prior Art

In current reaction engine systems such as found in today's rocket engines, problems may arise in relation to optimizing the performance of the engine(s) so as to ensure operative efficiency from launch to in-space operations. In the past, attempts to resolve the problems attendant in a fixed geometry engine included the deployability of nozzle sections or inflatable, extendible nozzle plugs or other mechanical means for changing the contour of the nozzle. The concept behind these mechanical solutions was that the geometry of the missle nozzle could be modified to provide a variable nozzle ratio contingent upon the pressure environment and flight scenario throttling demands. However, these mechanical devices added weight and because of their construction were prone to failure due to the hostile working environment and the demands placed upon the reaction engine system.

OBJECTS OF THE INVENTION

One object of the present invention is to vary the flow area ratio of a reaction engine nozzle section determined by mission performance requirements.

Yet another object of the present invention is to provide a reaction engine including a thrust nozzle flow area ratio control means associated therewith.

Still another object of the invention is to provide means for effecting a nozzle area ratio variance within a fixed-geometry reaction engine nozzle by non-mechanical means.

SUMMARY OF THE INVENTION

Accordingly, the present invention overcomes the disadvantages of the prior art by providing a variable expansion ratio reaction chamber comprising a cylindrical combustor, propellant injection means and a DeLaval nozzle having convergent and divergent wall portions which contract the combusted propellants or gases deliverd by the combustor to achieve sonic flow conditions at and about the nozzle throat. Upon passing through a divergent portion, the flow of these gases is expanded to achieve supersonic velocities at the nozzle exit.

Without the variable expansion ratio reaction engine of the present invention, the flow conditions would remain constant at the throat plane throughout the usable operating range of the reaction type engine thrust chamber. This is because the nozzle expansion area ratio for the thrust chamber is fixed by the ratio of the area at the nozzle exit plane divided by the area at the nozzle throat plane. The contour of the DeLaval nozzle is governed essentially by the axial rate of area change along the nozzle during combustion.

In operation, the fluid flow area at and near the throat of the nozzle may be varied utilizing a plurality of circumferentially and axially spaced fluid injection ports formed within the thrust nozzle wall and communicating with an external fluid storage tank. Depending upon the throttling and back pressure requirements at any given time during flight, combustion gases passing through the nozzle throat of the combustion chamber can be optimized by varying the expansion ratio of the flow at the throat of the chamber nozzle.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
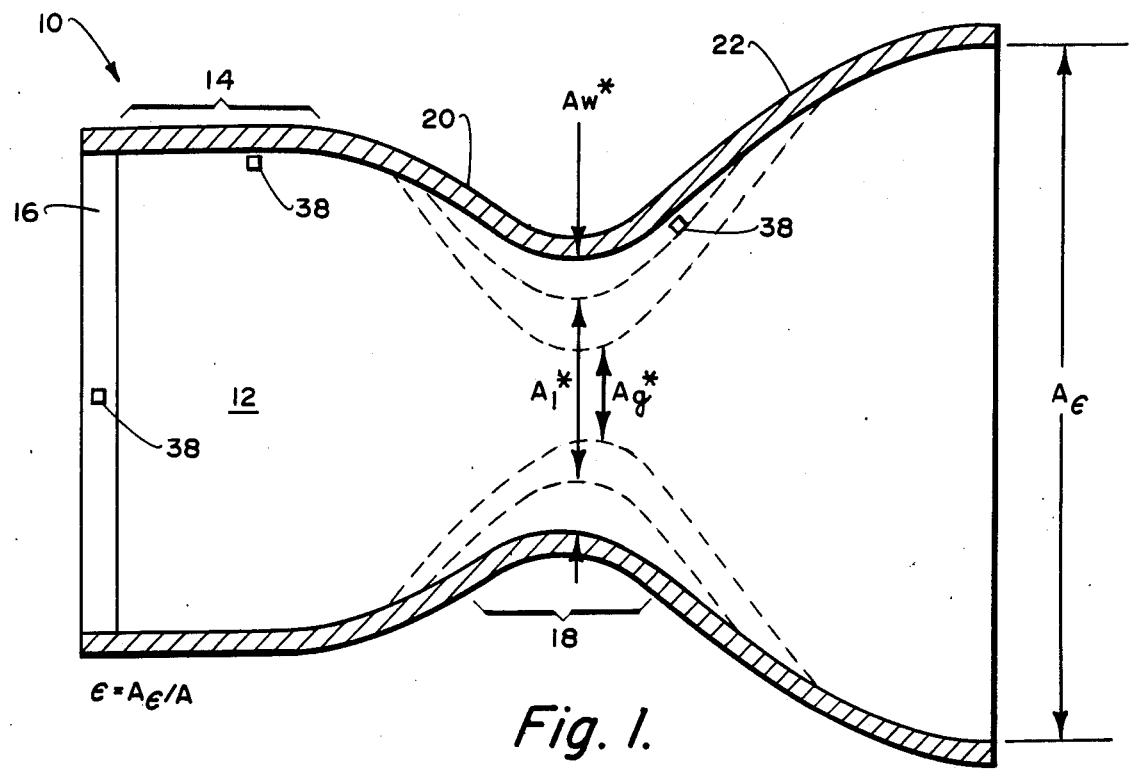
FIG. 1 is a schematic cross-sectional view of a reaction engine thrust chamber and possible variations in throat area geometry.

FIG. 1 illustrates a variable expansion ratio reaction engine or platform 10 having a combustion or reaction chamber 12 for producing hot combustion gases.

The chamber includes a cylindrical combustor section 14, and an injector 16 for injecting propellants at relatively low initial velocities into combustor 14 for combustion. A DeLaval nozzle includes a nozzle throat section 18 formed by converging wall portion 20 and diverging wall portion 22. The converging wall portion 20 contracts combusted propellants delivered by the combustor 14 to to achieve sonic flow conditions at and about the nozzle throat section 18. Divergent wall portion 22 then expands the flow to achieve supersonic exit velocities at a gas discharge nozzle exit ($A_e$).

Figure 2:
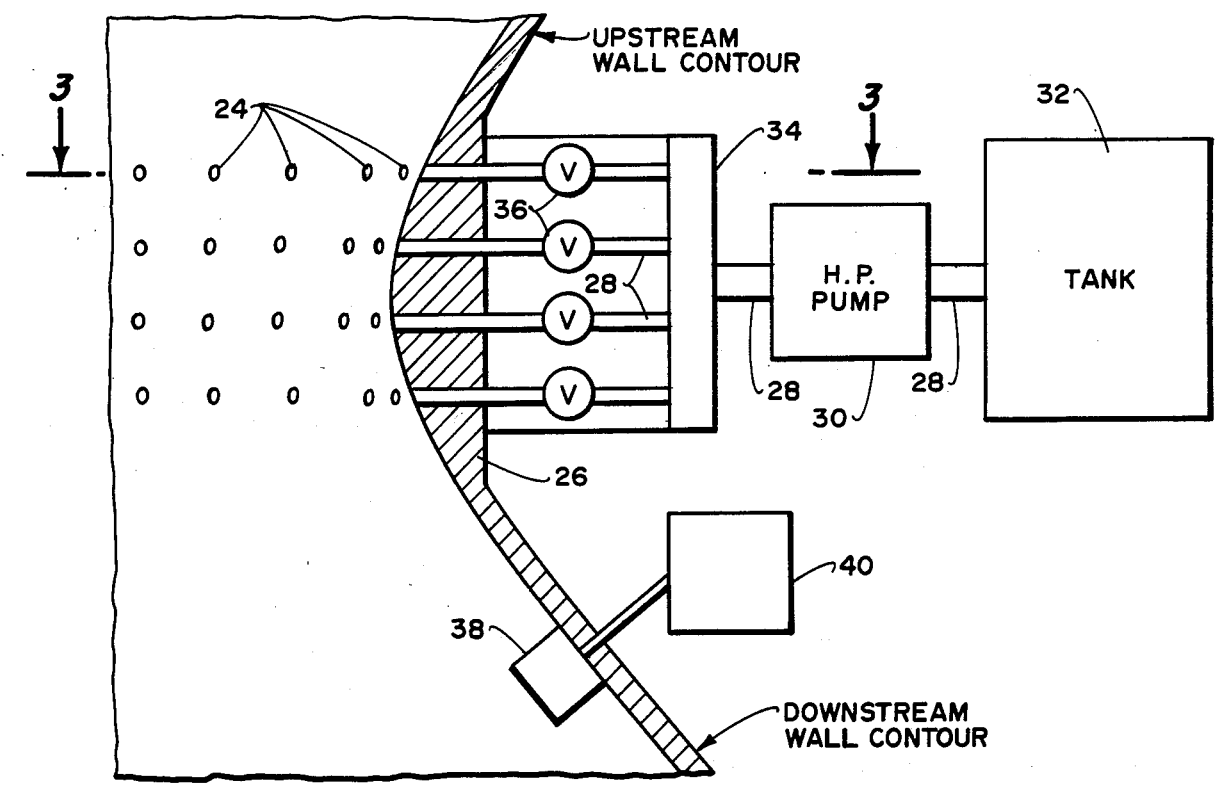
FIG. 2 is a partial sectional view showing internal details of a fluid supply system and valving means for controlling the input of fluid within the control apparatus.

As seen in FIG. 2, the reaction engine chamber 12 includes a plurality of circumferentially and axially spaced injection ports 24 passing through thrust nozzle wall 26 within the area of nozzle throat section 18. The inejection ports 24 are in communicative relationship with the interior of the reaction chamber and provided with conduits 28 communicating with a high pressure pump 30 and a fluid storage tank 32 carried by the reaction engine.

Figure 3:
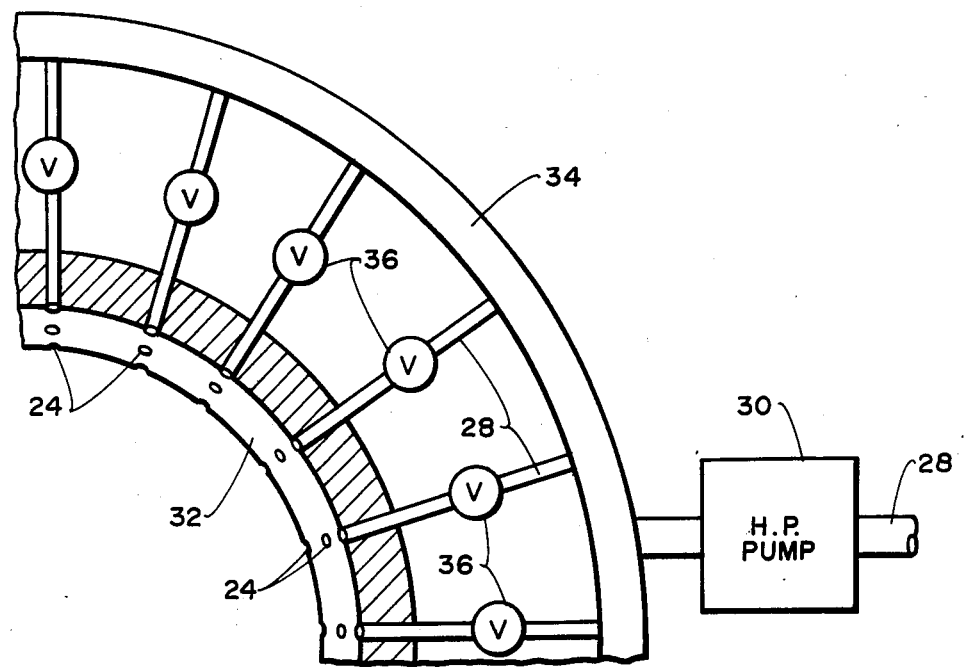
FIG. 3 is a partial top view taken along line 3—3 of FIG. 2 further detailing the fluid supply system.

Referring to FIG. 3, the injection ports 24 formed within the wall 26 of the throat nozzle section 18 are connected to a manifold 34, by conduits 28 having control valves 36. Activation of a flow of fluid contained in tank 32 by sensors 38 (see FIG. 2), as more fully explained below, allows selective introduction of the fluid (injectant) into the area of the nozzle throat section 18.

As shown in FIGS. 1 and 2, sensors 38 are positioned within the reaction engine 10 to monitor engine environment and performance, and control pressure and flow rate of the injectant(s). The sensors 38 also monitor main propellant pressure flow through injector 16 and reaction chamber 12 as well as combustion pressure within combustor 14. This information is conveyed electrically to an on-board computer system 40 which controls injectant flow rate through both axial and circumferential ports 24 to optimize nozzle throat area by constricting the mainstream gas flow area to a value $A_1^*$ (see FIG. 1).

Size and circumferential spacing for injectant ports 24 is from about 0.030 inch diameter to about 0.060 inch, respectively. Vertical spacing between any two rows of injectant ports is also about 0.060 inch.

The injectants are preferably low molecular weight combustible fluids of $H_2$, He, $CH_4$ and mixtures thereof which provide a large volume occupancy for a given mass flow rate. Furthermore, heating of the fluid by heat exchange or other means prior to fluid injection through the wall will be beneficial to reduce wall flow rate demands by injectant fluid volume reduction.

Referring again to FIG. 1, the general geometric effect required to reduce the nozzle throat area from the wall reference value $A_\omega^*$ to the successive reduced throat areas $A_1^*$, and $A_g^*$, respectively is illustrated. This provides a greater nozzle area ratio ($A_\epsilon/A_g^*$), which allows greater nozzle gas expansion. The increased chamber pressure for a given combustion flow level maximizes combustion efficiency.

In order to more fully understand the relationship between throat area geometry of fluid injection flow rate, Table 1 is provided to more fully understand the operational aspects discussed hereinbelow.

TABLE 1

$A_\omega^*$: wall reference throat area
$A_1^*$: Reduced throat area
$A_g^*$: Second position reduced throat area
$A_\epsilon$: Expansion nozzle exit area
$\rho_w$: Injectant density
$\rho_g^*$: Mainstream gas density
$V_w$: Injectant velocity
$V_g^*$: Mainstream gas velocity
$\pi$: Pi (3.14159)
$D^*$: Throat geometric diameter
$L$: Length of injectant zone
$W_{inj}$: Injectant flow rate
$W_{main}$: Main gas flow rate In operation, sensors 38 (see FIG. 2) in cooperation with the on-board computer command and control system 40 monitors the reaction engine operating environment, main propellant flow rate into injector 16, and combustion pressure in combustor 14. The control system thereby determines the need for varying the virtual geometry of the throat necessary for maximum performance requirements. If required, the control system 40 activates high pressure pump 30 which extracts measured pressurized quantities of an injectant fluid from tank 32 and introduces the fluid into manifold 34, conduits 28 and ports 24 where the fluid is controllably injected into nozzle throat section 18.

Values for the injectant density and velocity expresses as $\rho_w V_w$ need to be high enough to blow off a viscous gas boundary layer from the inner wall surface area of throat section 18 without causing excessive penetration of the fluid injectant into the mainstream combustion gases. Also, the values $\rho_w V_w$ relate to the mainstream gas density and velocity, as follows:

$$0.1 \leq \left(\frac{\rho_w V_w}{\rho_g^* V_g^*}\right) \leq 0.5$$

The values thus become a function of diameter closure in nozzle throat section 18 in relation to fluid injection momentum required for constriction of the throat area diameter. A lesser quantity of fluid is controllably injected upstream and downstream if needed to provide a smooth flow boundary along throat section 18 as shown in FIG. 1.

The flow rate relationship for the injectant flow rate ($W_{inj}$) to main gas flow rate ($W_{main}$) is generally expressed as:

$$\frac{W_{inj}}{W_{main}} = \frac{\rho_w V_w \pi D^* L}{\rho_g^* V_g^* \frac{\pi}{4} D^{*2}} = \frac{4\rho_w V_w L}{\pi \rho_g^* V_g^* D^*}$$

Consequently, controlling the injection flow rate of a fluid is possible for a given injection momentum ($\rho_w V_w$) and given mainstream ($\rho_g^* V_g^*$) flow rate, by reducing the length of the injectant zone versus throat geometric diameter or $L/D^*$. In practice this relationship may be expressed as:

$$0.1 < L/D^* < 0.25$$

which provides a smooth virtual throat for the gas path to follow.

By controlling the velocity, flow rate of the injectant introduced through the ports 24, and the burn rate or combustion thereof, the expansion ratio of combustion gases passing through the nozzle throat portion can be optimized. The injected fluid then merges or interacts (combust) with the main stream propellant flow thereby maximizing the performance in the supersonic nozzle section. Lessening the flow of fluid through the injection ports will vary or decrease the nozzle area ratio to that approaching the geometric wall value. For a fixed nozzle exit this provides a higher nozzle area ratio to be achieved on a selective basis which in turn provides a higher nozzle efficiency by controlling combustion chamber pressure as thrust demands require.

The reaction engine design of the present invention has applicability to high heat flux devices such as ion, laser, particle beam, rocket engine nozzles and similar devices.

It will of course be realized that various modifications can be made in the design and operation of the present invention without departing from the spirit thereof. Thus, while the principle, preferred construction, and mode of operation of the invention have been explained and what is now considered to represent its best embodiment has been illustrated and described, it should be understood that within the scope of appended claims the invention may be practiced otherwise than as specifically illustrated and described.

What is claimed:

1. A variable expansion ratio reaction rocket engine for producing a mainstrean of hot combustion gases comprising:
    a reaction chamber including a thrust nozzle portion formed by converging and diverging wall portions in which the diverging portion terminates in a gas discharge and through which the combustion gases pass;
    a nozzle throat section at the juncture of the convergent-divergent wall portions;
    rows of circumferentially and axially spaced injection ports formed within the wall portions and communicating therethrough and into the reaction chamber;

a plurlity of fluid conduit means in communication with the injection ports;

at least one high pressure pump in communication with the plurality of fluid conduit means;

a fluid containing storage tank including a conduit in communication with the high pressure pump; and means for selectively controlling a flow of fluid out of the tank, through the pump and to the fluid conduit means and the injection ports for controllng a cross-sectional area of the mainstream combustion gases passing through the thrust nozzle according to the relationship $$\frac{w_{inj}}{w_{main}} = \frac{\rho_w \cdot V_w \pi D^* L}{\rho_g^* V_g^* \pi D^{*2}} = \frac{4\rho_w V_w L}{\pi \rho_g^* V_g^* D^*}$$

thereby optimizing an expansion ratio within the chamber.

2. A variable expansion ratio reaction rocket engine according to claim 1 wherein the ports are each of about 0.030 inch diameter.

3. A variable expansion ratio reaction engine according to claim 1 wherein the injection ports are circumferentially spaced from each other by about 0.060 inch.

4. A variable expansion ratio reaction rocket engine according to claim 1 wherein the rows of injection ports are spaced from each other around the thrust nozzle wall by about 0.060 inch.

5. A variable expansion ratio reaction rocket engine according to claim 1 wherein the fluid is a low molecular weight fluid selected from the group consisting of hydrogen, helium, methane and mixtures thereof.

6. A variable expansion ratio combustion chamber according to claim 1 wherein the fluid conduit means includes valves functionally positioned therein.

* * * * *